United States Patent
Kopetzky et al.

(10) Patent No.: US 6,340,127 B1
(45) Date of Patent: Jan. 22, 2002

(54) HARMONIC REDUCTION GEAR AND SAFETY BELT APPARATUS IN MOTOR VEHICLES COMPRISING A HARMONIC REDUCTION GEAR OF THIS KIND

(75) Inventors: Robert Kopetzky, Lonsee (AT); Thomas Kempfle, Bibertal (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/428,985

(22) Filed: Oct. 29, 1999

(30) Foreign Application Priority Data

Oct. 29, 1998 (DE) .......................... 198 49 987

(51) Int. Cl.$^7$ .................... B60R 22/415; F16H 1/28
(52) U.S. Cl. ............. 242/382.2; 475/162; 475/180
(58) Field of Search ................. 242/382.2, 382.1, 242/382.4; 297/478; 280/806, 807; 475/162, 168, 180

(56) References Cited

U.S. PATENT DOCUMENTS

| | | | | |
|---|---|---|---|---|
| 2,356,914 A | * | 8/1944 | Blancha | 475/162 |
| 2,845,821 A | * | 8/1958 | De Noyers | 475/180 |
| 2,884,815 A | * | 5/1959 | Pittman | 475/162 |
| 3,888,011 A | * | 6/1975 | Hunt | 475/162 |
| 4,841,811 A | * | 6/1989 | Bajulaz | 475/162 |
| 4,948,066 A | * | 8/1990 | Matsumoto et al. | 242/382.2 |

FOREIGN PATENT DOCUMENTS

| | | |
|---|---|---|
| DE | 195 39 284 | 4/1997 |
| EP | 844 152 | 5/1998 |

OTHER PUBLICATIONS

Patent Abstracts of Japan, M–1679, Sep. 27, 1994, vol. 18, No. 512.

* cited by examiner

Primary Examiner—John M. Jillions
(74) Attorney, Agent, or Firm—Foley & Lardner

(57) ABSTRACT

The invention relates to a harmonic reduction gear comprising a drive-side eccenter (12) which engages into a complementary opening (13) of an outer toothed member (14), and a housing-fixed inner toothed ring (15) which is arranged around the outer toothed member (14) and on which the outer toothed member (14) rolls with the reversed rotational sense as the eccenter (12) when the eccenter (12) is rotated. The invention consists in that the outer toothed member (14) has only few, preferably only two at least substantially diametrically opposed teeth (16, 17) of which during rotation of the eccenter (12) in each case one (16) is pushed into a tooth depression (18) of the inner toothed ring (15) while the other (17) is lifted out of the inner toothed ring (15) and is pivoted counter to the rotational sense of the eccenter (12) to the next tooth depression (18') into which, during further rotation of the eccenter (12), the other tooth (17) is pushed in with the first tooth (16) being lifted out, and so forth.

11 Claims, 9 Drawing Sheets

Figure 1:
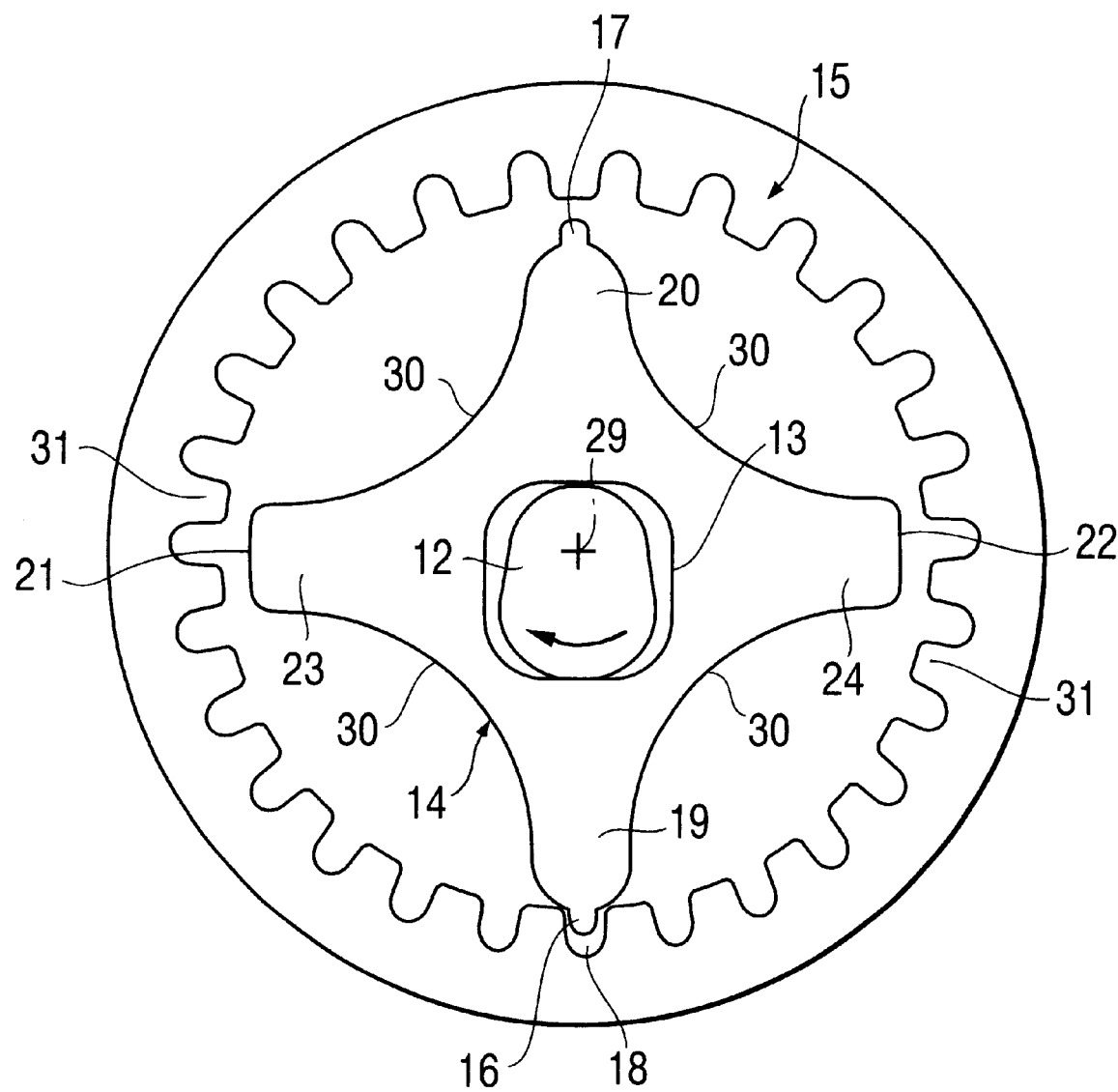

HARMONIC REDUCTION GEAR AND SAFETY BELT APPARATUS IN MOTOR VEHICLES COMPRISING A HARMONIC REDUCTION GEAR OF THIS KIND

The invention relates to a harmonic reduction gear and to a safety apparatus for motor vehicles comprising a reduction gear of this kind.

Harmonic reduction gears, which are also called cycloidal gears, have the advantage that rotational motions can be stepped down to an extreme extent. For this the outer toothed ring of an outer toothed member which is driven by the eccenter, in general cooperates with a surrounding inner toothed ring, which is fixed to the housing, in such a manner that the outer toothed member rolls on the inner toothed ring in the rotational sense which is opposite to that of the eccenter. For this the outer toothed member has a diameter which is so much smaller than that of the surrounding inner toothed ring that a radially one-sided rolling motion is possible. Through the fact that the outer toothed member has fewer teeth than the surrounded inner toothed ring, the reduction ratio is determined in dependence on the ratio of the numbers of teeth of the outer toothed member and the inner toothed ring.

Reduction gears of this kind are used to particular advantage in belt winders of safety belt apparatuses in motor vehicles (see e.g. U.S. Pat. No. 5 518 197 and EP 0 844 152 A) in order to actuate a draw-out blocking, when the safety belt is largely drawn out or largely wound up, respectively, in such a manner that it blocks or again enables the drawing out of the belt, respectively. Through this it can be prevented in particular when strapping in children that the latter draw out the safety belt by playing with the safety belt holding them to such an extent that the safety retention function is impaired. Since the belt winder makes a large number of rotations when being drawn from the fully drawn in to the fully drawn out position, it is a matter of placing a reduction gear between the draw-out blocking and the belt winder which steps down the rotary movement to such an extent that a defined switching operation is triggered only at each end of the belt draw-out movement.

Disadvantageous in the known harmonic reduction gears is that two components are required which are provided with teeth being arranged all around. Gear wheels or toothed rings, respectively, are however rather complicated and expensive to manufacture and also contribute to an undesirable weight increase in particular in the safety belt apparatuses for motor vehicles.

The object of the invention is thus to provide a reduction gear of the initially named kind in particular for safety belt apparatuses in motor vehicles having a switchable draw-out blocking, which has a considerably simplified construction so that in particular it can be manufactured more economically, and which also enables a weight reduction.

The idea of the invention is thus to be seen in that the outer toothed member, which is provided with an outer toothed ring which extends over the entire periphery, is reduced to a rotary arrangement having only two diametrically opposed outer teeth left. The idea of the invention is also not departed from when instead of a single tooth on each side of the axis of rotation a few, in particular two and in the extreme case three, teeth are provided.

In this way the diametrically opposed teeth are alternatingly brought into and out of engagement with the inner toothed ring, with in each case a peripheral displacement of the teeth opposite to the rotational sense of the eccenter by preferably one tooth in each case taking place through the eccenter.

Thus, as a result of the design in accordance with the invention all the teeth of the previously usual outer toothed ring with the exception of preferably two are omitted, which in addition to a highly simplified manufacture also brings about a considerable saving in weight.

The two teeth are preferably arranged on diametrically opposed arms.

In order to perfectly control the pivotal movement occurring during the passage from one tooth depression into the next one, of the respective tooth which has left a tooth depression, the support surfaces are expedient, which ensure a perfect conduction of a tooth into each next tooth depression. These support surfaces are preferably arranged on diametrically opposed arms too.

The arms of the teeth and of the support surfaces preferably form a cross arrangement, the beams of which are mutually displaced by 90° in each case.

The opening which is provided for the eccenter is located radially inwardly in the arms or in the cross arrangement, respectively, and indeed in accordance with claim 7 in each case in the middle.

The abutment means for switching apparatus are to be attached in a suitable manner to the outer toothed member having only two teeth.

The safety belt apparatus in accordance with the invention the eccenter is rotationally fixedly coupled to the belt winder, while the abutment means are arranged on the outer toothed member having only two teeth.

Figure 2:
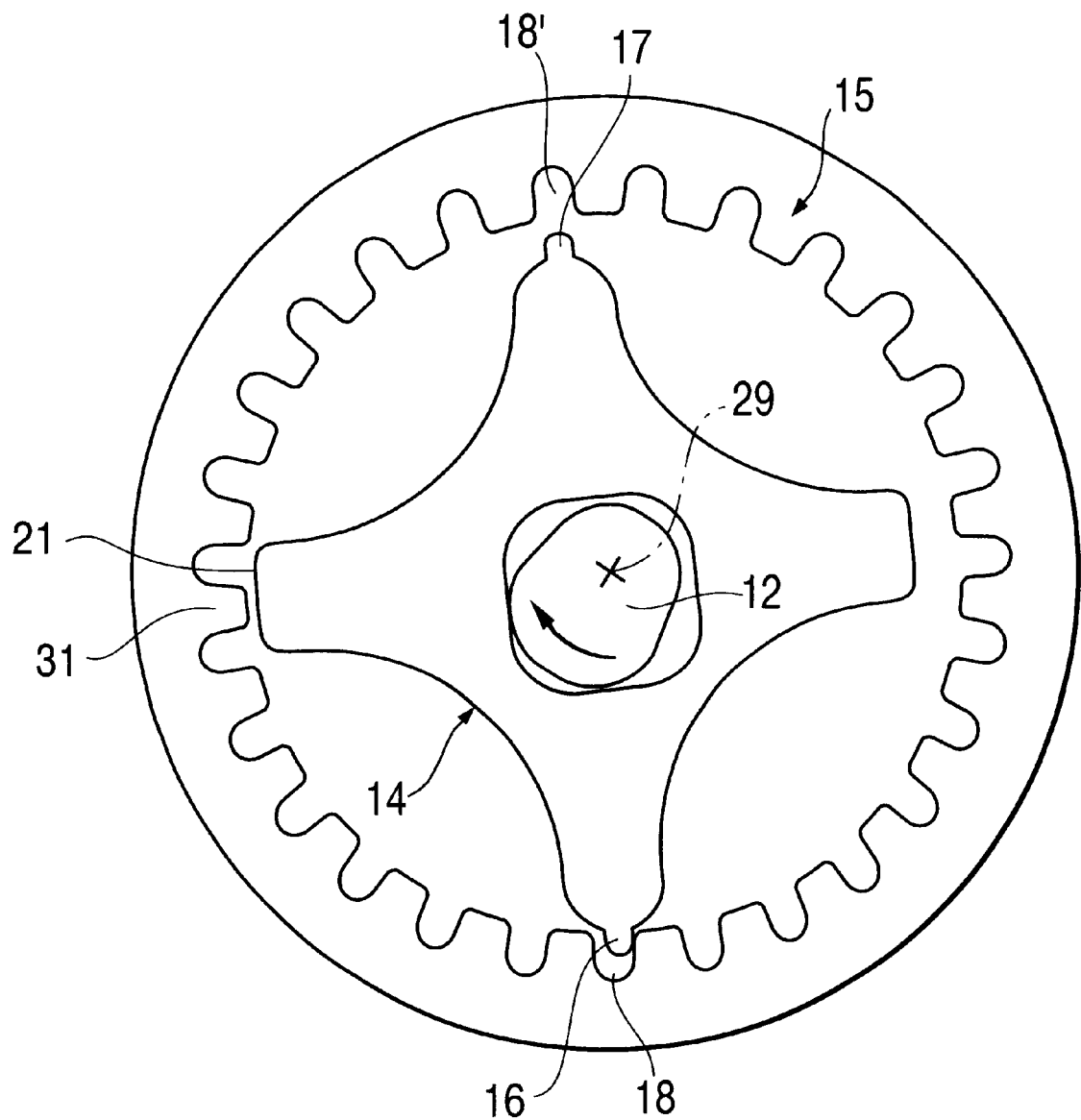
Figure 3:
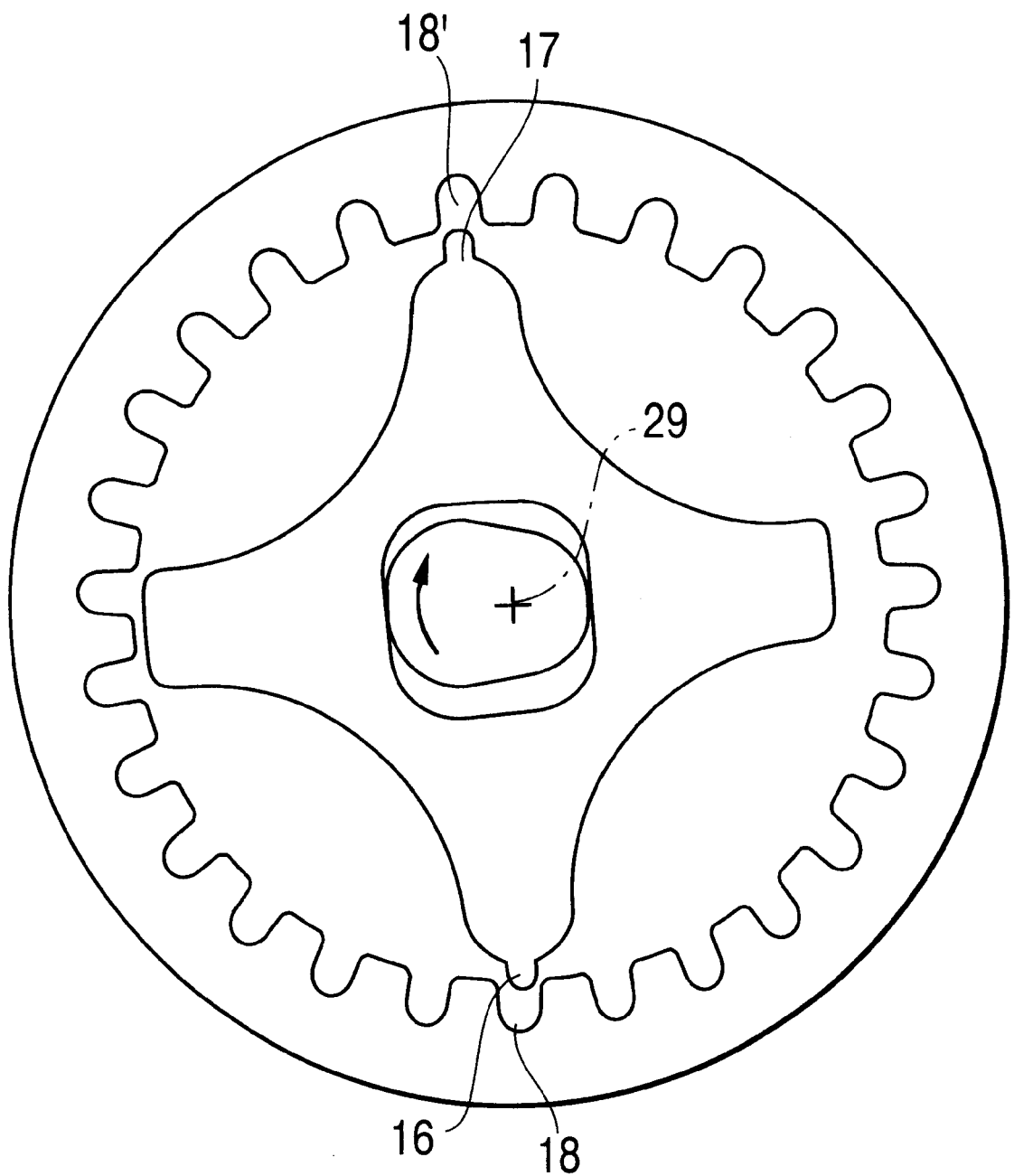
Figure 4:
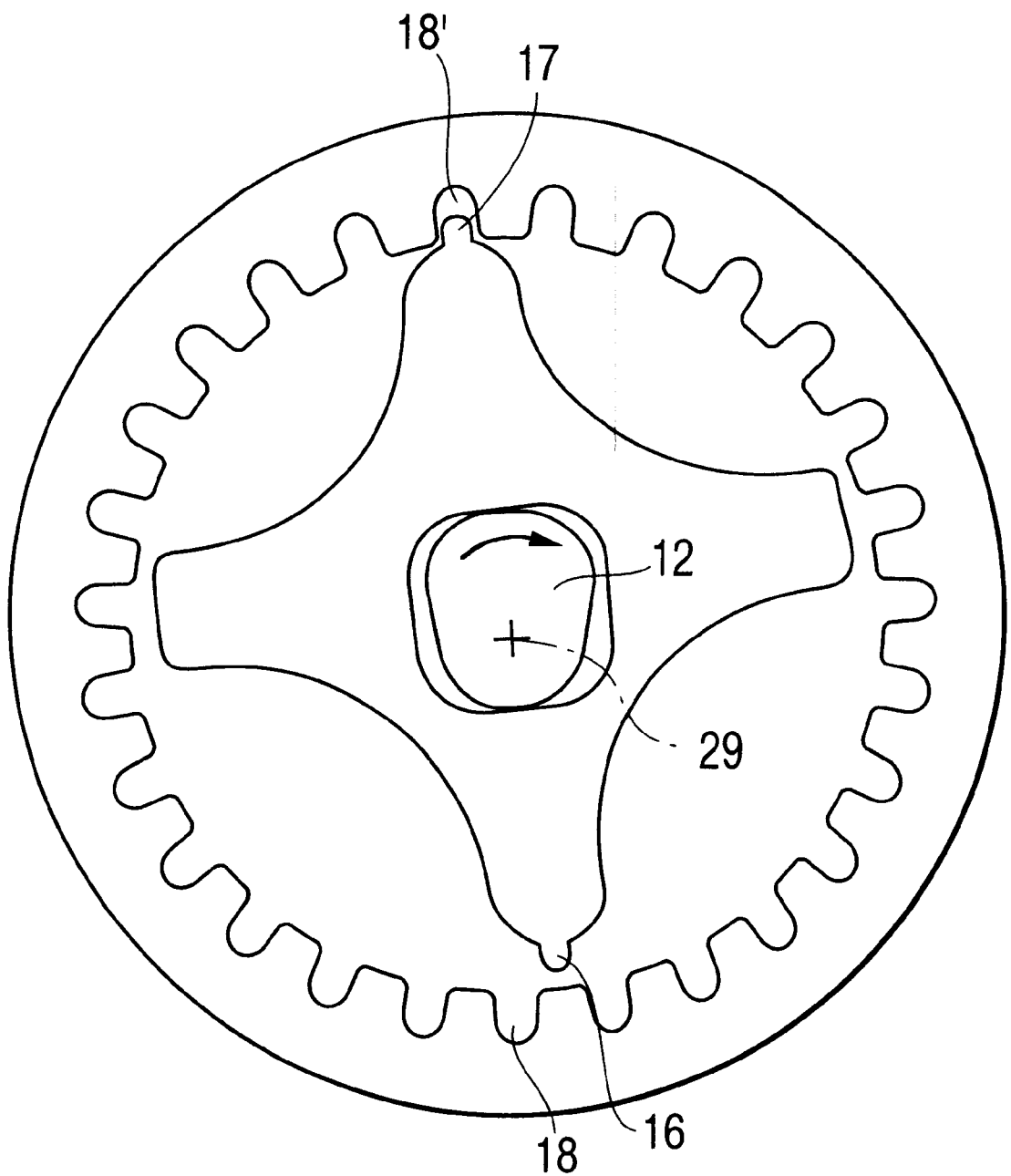
Figure 5:
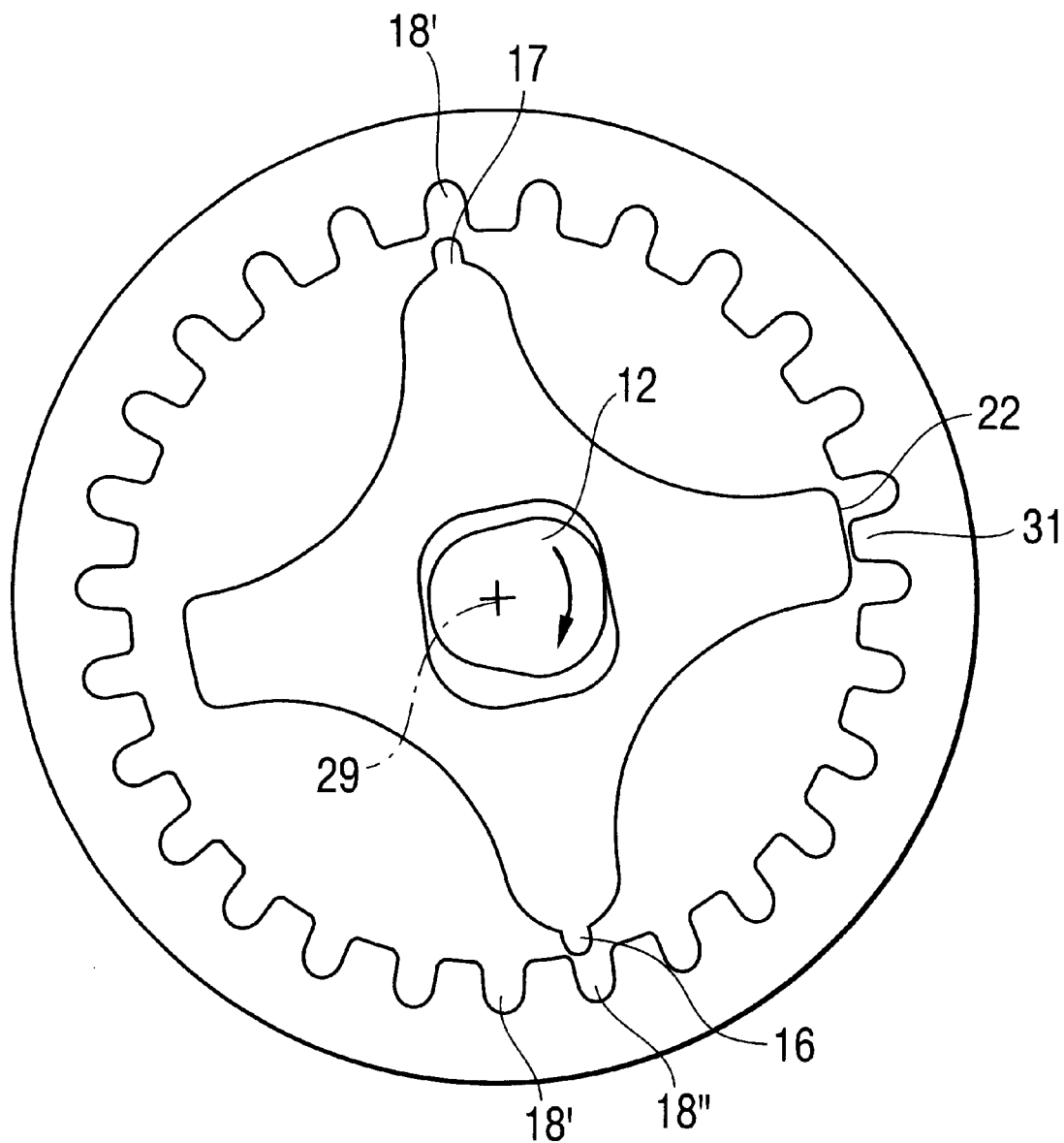
Figure 6:
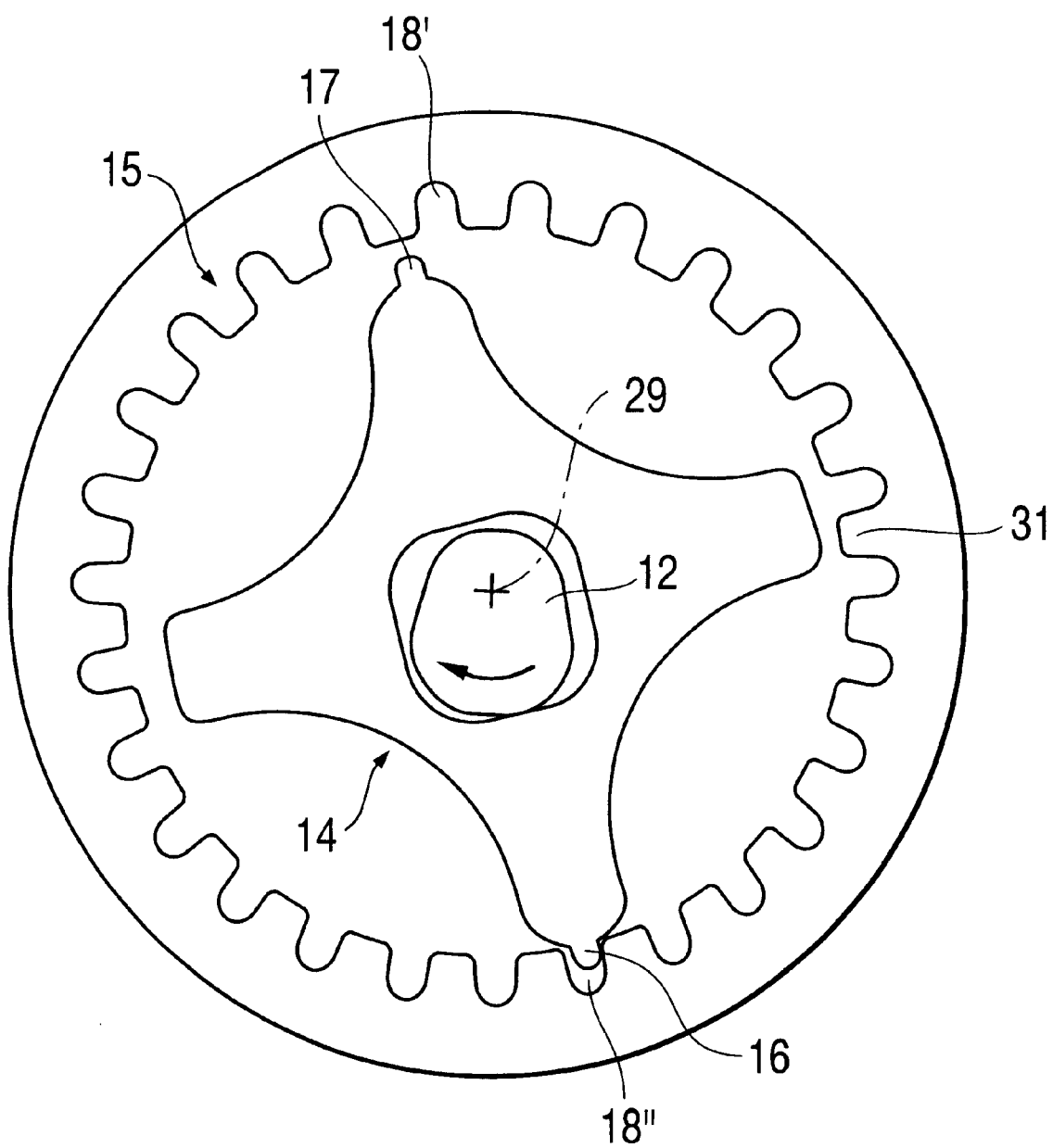
Figure 7:
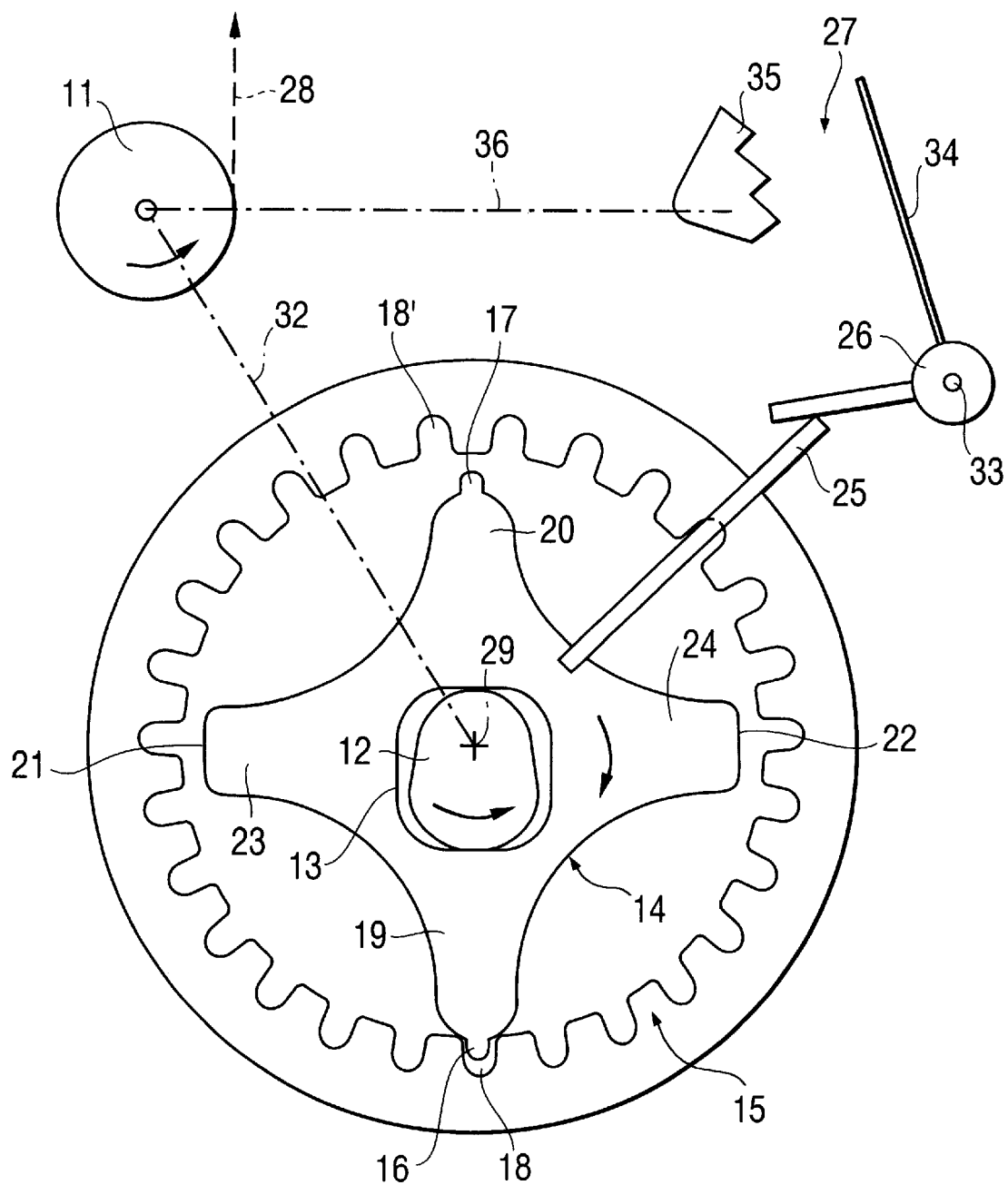
Figure 8:
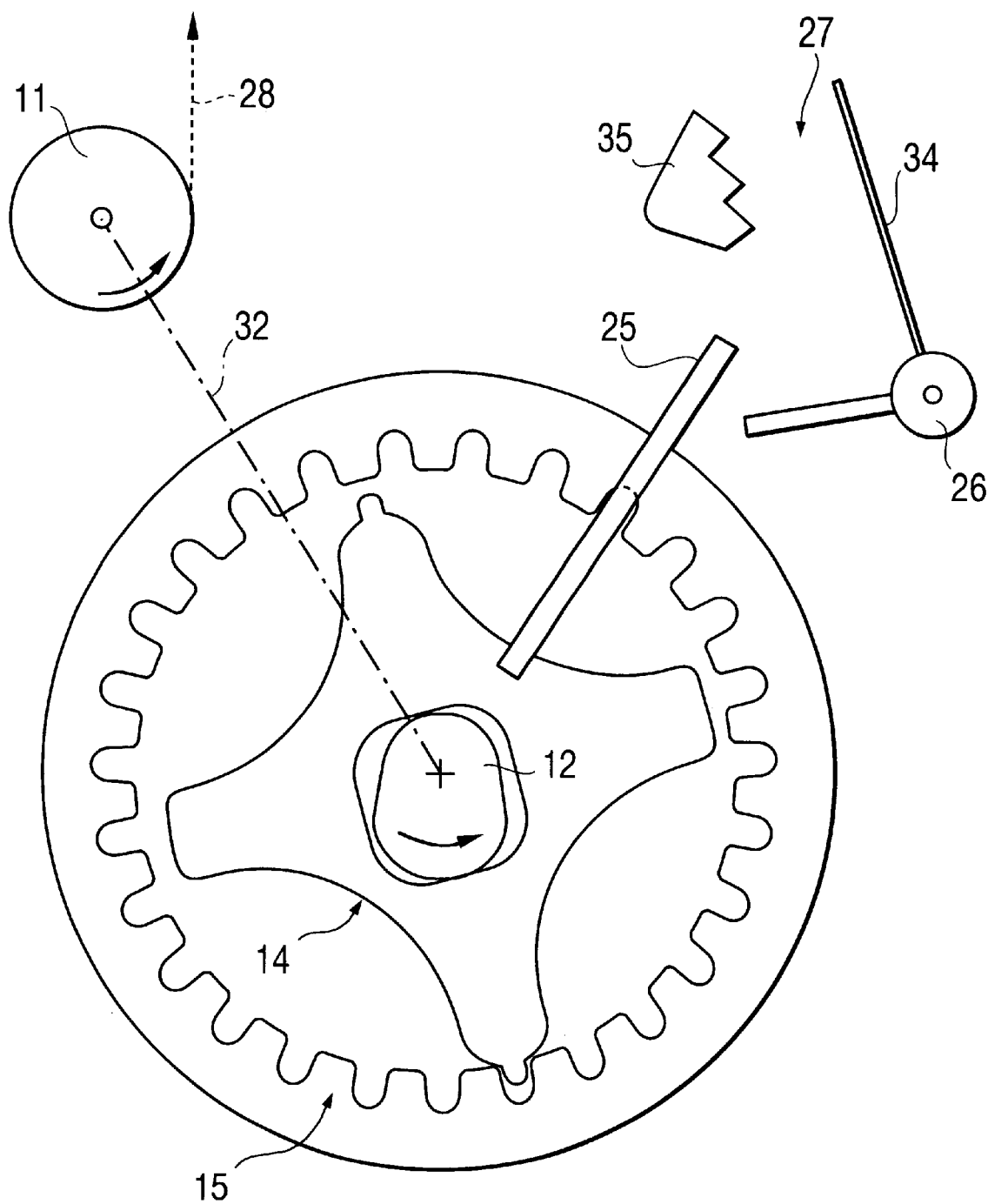
Figure 9:
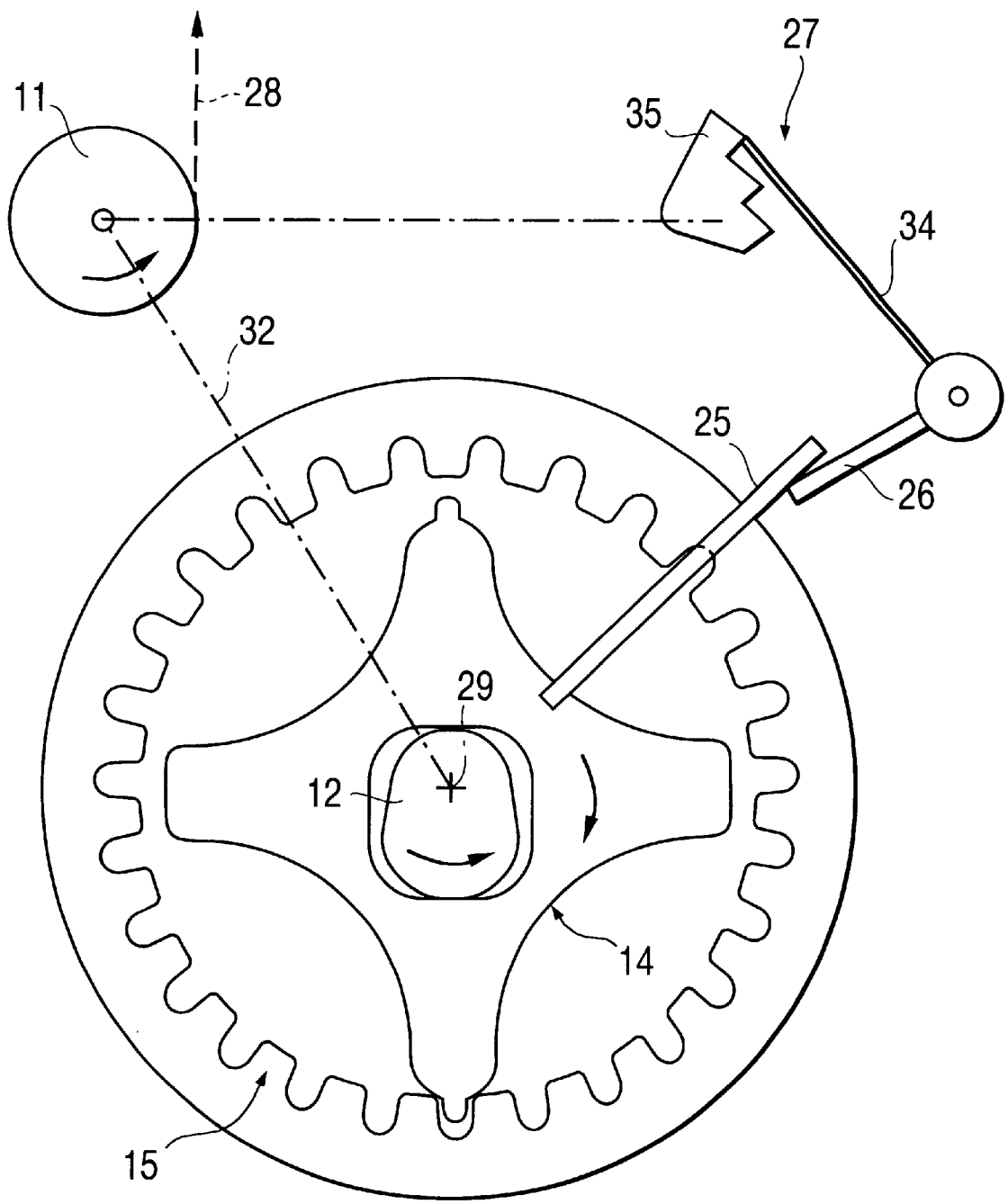

The invention will be explained in the following example with reference to the drawings. Shown in these drawings are:

FIG. 1 a schematic, partly sectioned plan view of a harmonic reduction gear in accordance with the invention in an end position, FIG. 2 a view analogous to FIG. 1, with the eccenter however being rotated further by approximately 45° clockwise, FIG. 3 another similar view with the eccenter being rotated further by 90° clockwise with respect to FIG. 1, FIG. 4 a similar view with the eccenter being rotated further by 180° with respect to FIG. 1, FIG. 5 a similar view with the eccenter being rotated further by 270° clockwise with respect to FIG. 1, FIG. 6 a similar view with the eccenter being rotated further by 360° with respect to FIG. 1, FIG. 7 a view of the reduction gear in the position in accordance with FIG. 1 in arrangement at a merely schematically indicated safety belt apparatus in motor vehicles, and indeed at the beginning of the drawing out of a safety belt which is fully wound up on the belt winder, FIG. 8 a view similar to that of FIG. 7 with the outer toothed member being rotated further by nearly a complete rotation clockwise and FIG. 9 a view similar to that of FIG. 8, with the outer toothed member being rotated further by 360° with respect to FIG. 7 and having actuated the draw-out blocking in a sense which prevents the belt from being drawn out.

In accordance with FIG. 1 an eccenter 12 is arranged on an axis of rotation 29 of which it is assumed in FIG. 1 that it rotates the eccenter 12 in the direction of the arrow, i.e. clockwise.

The eccenter 12 engages axially in an opening 13 which is complementary to it and which is provided in the middle of an outer toothed member 14 which in accordance with the invention has two diametrically opposed arms 19, 20, at the radial outer ends of which in each case one tooth 16 or 17, respectively, is located. At 90° to the arms 19, 20 the outer toothed member 14 has two further diametrically opposed arms 23, 24, to the radial outer ends of which support surfaces 21 and 22, respectively, are located. Together the arms 19, 20, 23, 24 form a cross arrangement, with the transition of the arms 19, 20, 23, 24 into one another being rounded off, as indicated by 30 in FIG. 1.

Around the outer toothed member 14 concentrically to the axis of rotation 29 extends a circular inner toothed ring 15 of a diameter such that when one tooth 16 of the outer toothed member 14 fully engages into a tooth depression 18 of the inner toothed ring 15, the diametrically opposed tooth 17 is out of engagement with the inner toothed ring 15, and vice versa.

The radial extent of the support surfaces 21, 22 is such that by abutment of the support surfaces 21, 22 on the teeth 31 of the inner toothed ring 15, the pivotal movements of the outer toothed member 14 produced by the eccenter 12 are stabilized in such a manner that the teeth 16, 17 are in each case perfectly conducted into the associated tooth depressions 18 of the inner toothed ring 15, as results in detail from the following description of the functioning.

Let it be assumed that the eccenter 12 begins to rotate clockwise in the direction of the arrow starting from the position in accordance with FIG. 1. In this position the lower tooth 16 in FIG. 1 is first in complete engagement with a lower tooth depression 18 of the inner toothed ring 15.

In accordance with FIG. 2, in which, as well as in the further figures, only the most important reference symbols of FIG. 1 are repeated, the eccenter 12 has rotated further clockwise by about 45°, whereby the outer toothed member 14 is substantially pivoted to the left about the tooth depression 18, which is illustrated below, in such a manner that the upper tooth 17 of the outer toothed member 14, which is out of engagement with the inner toothed ring 15, comes into radial alignment with an upper tooth depression 18' of the inner toothed ring 15, being located more left. In this the left support surface 21, which now at least approximately abuts a tooth 31 of the inner toothed ring 15, ensures that the upper tooth 17 of the outer toothed member 14 and the tooth depression 18' are largely radially aligned with one another.

If now the eccenter rotates in accordance with FIG. 3 by a further 45°, the lower tooth 16 begins to lift out of the tooth depression 18 and the upper tooth 17 begins to move into the tooth depression 18'. This movement sequence continues during the rotational movement of the eccenter 12 which in accordance with FIG. 4 is continued by a further 90° to the effect that now the upper tooth 17 has completely entered into the upper tooth depression 18' and the lower tooth 16 has completely left the lower tooth depression 18. In this the lower tooth 16 executes a counterclockwise pivotal movement about the upper tooth depression 18'.

In accordance with FIG. 5 the eccenter 12 has continued its rotational movement by a further 90°, whereby the upper tooth 17 begins to leave the upper tooth depression 18' and the lower tooth 16 begins to enter into a further tooth depression 18" which is displaced counterclockwise with respect to the tooth depression 18. In this the right support surface 22, which is now supported on a tooth 31 where appropriate, effects a perfect conducting of the tooth 16 into the tooth depression 18".

After a complete rotation of the eccenter 12 with respect to FIG. 1 the position of the outer toothed member 14 in accordance with FIG. 6 is reached, in which the lower tooth 16 is now in complete engagement with the tooth depression 18" and the upper tooth 17 has come completely out of engagement with the upper tooth depression 18'.

The work play which was described with reference to FIGS. 1 to 6 now repeats on further clockwise rotation of the eccenter 12, i.e. the outer toothed member 14 approximately uniformly rotates counterclockwise, and indeed with a far lower speed of rotation than the eccenter 12. The reduction ratio can be set via the eccenter stroke and/or the number of teeth 31 or tooth depressions 18, respectively, of the inner toothed ring 15.

The essential advantages of the arrangement in accordance with the invention consist in that no rolling motion of a gear wheel takes place any longer, but rather a combined thrust and tilt movement of the outer toothed member 14 which is equipped with only two teeth.

The particular advantage of this arrangement also consists in a large degree of insensitivity to dust.

FIG. 7 shows the same rotational position of the outer toothed member 14 as FIG. 1. In addition, however, in FIGS. 7 to 8 the rotationally fixed coupling 32 of the eccenter 12 to the belt winder 11 of a merely indicated safety belt apparatus in motor vehicles is also schematically illustrated. The safety belt, which is wound up on the belt winder 11, is only indicated by a broken line at 28.

In addition, FIGS. 7 to 9 schematically show the abutment means 25 which are secured to the outer toothed member 14 and which are assumed here to be a radial arm. The abutment means 25 cooperate with a chassis-fixed switching apparatus 26 which is pivotal about an axis 33 and which actuates a draw-out blocking 27 which consists of a resilient arm 34 and a toothed ring 35 which is only section-wise indicated and which is rotationally coupled to the belt winder 11 in such a manner that on engagement of the arm 34 into the toothed ring 35, the safety belt can be drawn in but not drawn out. The functional coupling 36 between the toothed ring 35 and the belt winder 11 is only schematically indicated in FIG. 1 by a chain dotted line.

Let it now be assumed that the safety belt 28 is largely completely wound up onto the belt winder 11 in the position in accordance with FIG. 7. In this state the abutment means 25 should be in such an abutment position that the arm 34 is not in engagement with the toothed ring 35 and thus the draw-out blocking 27 does not hinder the belt from being drawn out, as indicated in FIG. 7.

If the safety belt 28 is now drawn out, the eccenter 12 rotates counterclockwise in FIG. 7, which leads to the outer toothed member 14 executing a highly stepped down clockwise rotational movement, with the lower tooth 16 and the upper tooth 17 alternatingly coming into engagement with the inner toothed ring 15. When the safety belt 28 is almost completely drawn out (FIG. 8) the abutment means 25 approach the switching apparatus 26 from the opposite side with respect to FIG. 7 in that the outer toothed member 14 has now carried out almost a full clockwise rotation.

FIG. 9 then shows the rotational position of the outer toothed member 14 after a complete 360° rotation with respect to FIG. 7. The abutment means 25 now act on the switching apparatus 26 from the opposite side and, on further rotation of the outer toothed member 14 from the position in accordance with FIG. 8 into the position in accordance with FIG. 9, finally bring the arm 34 into engagement with the toothed ring 35, whereby the draw-out blocking 27 becomes effective in the sense that from now on the safety belt 28 cannot be drawn out further.

If finally at some time a person who is secured by the safety belt 28 unbuckles, the safety belt 28 is wound up under the action of a retracting spring which is not illustrated in the drawing. In this the eccenter 12 now rotates clockwise, as has been assumed with reference to FIGS. 1 to 6. Through this the outer toothed member 14 rotates counterclockwise so that the abutment means 25 release themselves from the switching apparatus 26 and after a complete rotation finally arrive again in the position in accordance with FIG. 7 in which they move the switching apparatus 26 into a position in which the draw-out blocking 27 releases the belt draw-out again. The switching over of the draw-out blocking 27 from the position which blocks the drawing out into the position which releases the drawing out takes place when the safety belt 28 is approximately completely drawn in.

List of reference symbols 11 belt winder
12 eccenter
13 opening
14 outer toothed member
15 inner toothed ring
16 tooth
17 tooth
18 tooth depression
18' tooth depression
18" tooth depression
19 arm
20 arm
21 support surface
22 support surface
23 arm
24 arm
25 abutment means
26 switching apparatus
27 draw-out blocking
28 safety belt
29 axis of rotation
30 rounding off
31 tooth
32 coupling
33 axis
34 arm
35 toothed ring

What is claimed is:

1. A harmonic reduction gear comprising:

a rotatable eccenter;

a cross-shaped outer toothed member having a plurality of outer teeth and including an opening for receiving the eccenter;

a ring fixed to a housing and having inner teeth postioned to engage the outer teeth;

wherein the outer teeth alternately engage the inner teeth during rotation of the eccenter.

2. The gear of claim 1, wherein the cross-shaped member includes a plurality of arms and wherein two of the arms are diametrically opposed and include an outer tooth on a radial outer end.

3. The gear of claim 1, wherein the cross-shaped outer toothed member includes a plurality of arms and wherein two of the arms include a support surface positioned to limit the peripheral movements of the outer teeth.

4. The gear of claim 3, wherein two of the arms are diametrically opposed and include an outer tooth on a radial outer end.

5. The gear of claim 2, wherein two of the arms include a support surface positioned to limit the peripheral movements of the outer teeth.

6. The gear of claim 1, wherein the opening is positioned substantially in the middle of the cross-shaped outer toothed member.

7. The gear of claim 1, further comprising an abutment mechanism movable to prevent the rotation of the eccenter.

8. The gear of claim 7, further comprising a switching apparatus controlled by the abutment mechanism to alternately switch rotation prevention of the eccenter on and off.

9. A safety belt apparatus comprising:

a belt winder biased in the wind-up direction;

a draw out blocking mechanism for preventing the drawing out of the seat belt;

a harmonic reduction gear including a rotatable eccenter, a cross shaped outer toothed member having a plurality of outer teeth and including an opening for receiving the eccenter, and a ring having inner teeth positioned to engage the outer teeth;

wherein the belt winder is fixed to the eccenter and the draw out blocking mechanism is controlled by an abutment mechanism connected to the outer toothed member.

10. The apparatus of claim 9, wherein the draw out blocking mechanism prevents the drawing out of the belt when the belt is substantially drawn out.

11. The apparatus of claim 10, comprising a switching apparatus for releasing the draw out blocking mechanism to allow drawing out of the seat belt when the seat belt is substantially wound up.

* * * * *